Sept. 6, 1966 C. PRITCHARD 3,271,210

FORMATION OF P-N JUNCTIONS IN SILICON

Filed July 24, 1963

United States Patent Office 3,271,210
Patented Sept. 6, 1966

3,271,210
FORMATION OF P-N JUNCTIONS IN SILICON
Colin Pritchard, Birmingham, England, assignor to Westinghouse Electric Corporation, Pittsburgh, Pa., a corporation of Pennsylvania
Filed July 24, 1963, Ser. No. 297,309
5 Claims. (Cl. 148—187)

This invention relates, generally, to the processing of semiconductive material for the fabrication of semiconductor devices and, more particularly, to the formation of P-N junctions in silicon by diffusion of phosphorus.

In copending application Serial No. 297,343, filed July 24, 1963 by C. Pritchard and S. A. Zeitman and assigned to the assignee of the present invention, there was disclosed a process for forming P-N junctions in silicon by the diffusion of phosphorus whereby portions of the silicon surface were subjected to an electrolytic treatment to form a blackened layer thereon which resulted in a greater depth of penetration of the phosphorus in the blackened portion than in the unblackened portion thereby permitting the fabrication of devices, with only a single diffusion operation, having P-N junctions at different depths.

It is an object of the present invention to provide a method for the diffusion of phosphorus in silicon to form junctions of different depths which may be carried out without the necessity, as required by the aforementioned electrolytic blackening technique, of lead attachment to the semiconductive body and the other necessary operations for an electrolytic process.

Another object is to provide an improved method for the formation of P-N junctions in silicon by the vapor diffusion of phosphorus which permits a high degree of control over the extent of variation in depth of phosphorus penetration.

The present invention, in brief, provides an improved method for the formation of P-N junctions in silicon by the diffusion of phosphorus which includes blackening the surface by a chemical stain prior to exposing the surface to phosphorus vapor. This technique avoids the necessity of any electrolytic processing of the material and moreover results in a readily controlled diffusion depth.

Figure 4:
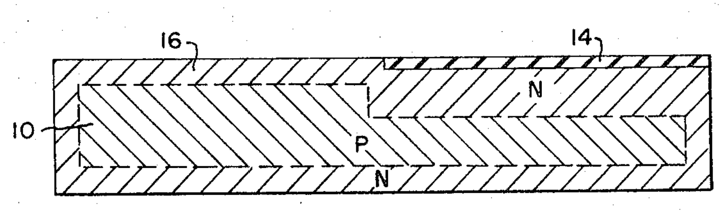
Figure 5:
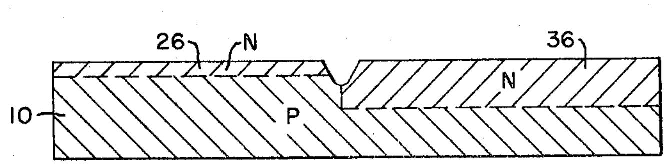
Figure 6:
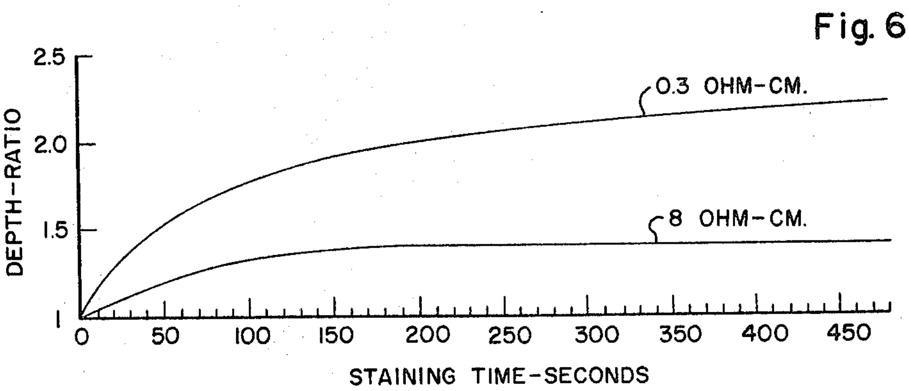

The present invention, together with the above mentioned and additional objects and advantages thereof will become more apparent with reference to the following description, taken in connection with the accompanying drawing, in which:

FIGURES 1 to 5 are side views, in cross section, of a semiconductive body being processed in accordance with one example of the present invention; and FIGURE 6 is a graph of a pair of curves illustrating the results achieved in the practice of the present invention.

Figure 1:
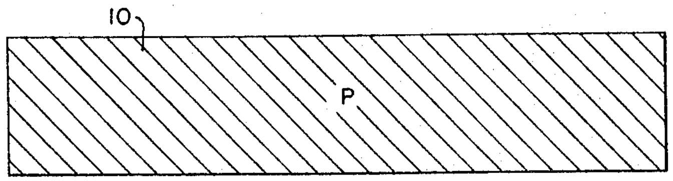

Referring to FIG. 1, a suitable P-type silicon substrate 10 for use as a starting material may be prepared by any of the known techniques for obtaining monocrystalline bodies of silicon or by the dendritic growth of silicon as taught in Patent 3,031,403 by A. I. Bennett. In the practice of the present invention the surface of the starting material 10 is first cleaned, unless the starting material is obtained from a dendritic crystal in which case surface preparation may be unnecessary. For conventionally grown crystals, the surface may be chemically polished in an etchant known as CP–4 comprising, in concentrated solution, by volume, three parts hydrofluoric acid, three parts acetic acid and five parts nitric acid. Alternatively, the surface may be prepared by lapping or by etching with a hot solution of water containing about 10% sodium hydroxide at a temperature of about 75° to 90° C. The purpose of the surface preparation is to remove contaminants from the surface and to make the surface uniform with a high degree of smoothness.

The P-type silicon starting material 10 may be doped with any of the known acceptor type impurities such as boron, aluminum, gallium or indium. The impurity concentration in the starting material is primarily determined by the required characteristics in the device to be fabricated. Formation of a chemically blackened layer used in accordance with this invention has been found to occur uniformly on P-type silicon having a resistivity of up to at least 10 ohm-centimeters and in this respect is an improvement over the electrolytic blackening process wherein uniform blackened layers were more difficult to obtain on substrates having resistivities approaching 10 ohm-centimeters.

Figure 2:
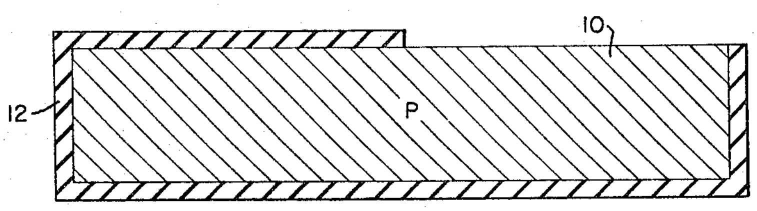

FIGURE 2 shows the starting material 10 after there has been deposited on a portion of the surface a masking material 12 so as to leave exposed only a portion of the surface. The masking material 12 may be any material not reactive with the semiconductor material which will protect the starting material from the action of a chemical stain. Suitable materials are Apiezon wax or a photoresist material such as that available under the name KPR. The use of such materials is well-known to the art for the selective masking of semiconductive surfaces.

Figure 3:
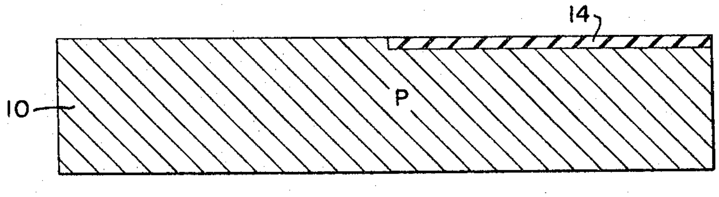

FIGURE 3 shows the body of semiconductive material 10 after additional steps have been performed. The first operation performed on the masked semiconductor is the chemical blackening of the exposed portion of the starting material 10 so as to produce a blackened silicon layer 14. The chemical blackening is performed by dipping the body of P-type silicon into an acidic stain which contains concentrated hydrofluoric acid (48.9% HF) plus a small amount of concentrated nitric acid (69% $HNO_3$). Successful results have been obtained with solutions within the range of from about 100 parts by volume to about 1000 parts by volume concentrated hydrofluoric acid to 1 part by volume concentrated nitric acid. In the description of the present invention and the claims defining the invention, reference to concentrated hydrofluoric acid and concentrated nitric acid means the standard concentrated solutions of such acids which contain about 48.9% HF and about 69% $HNO_3$. It is apparent, however, that suitable stains for the practice of this invention may be obtained by starting with the acids in other concentrations.

The time of the treatment with the chemical stain may be determined by the appearance of the silicon body which acquires an evenly colored brownish or blackish film over the exposed portion of its surface. Alternatively, the chemical stain may be applied by merely applying a few drops of the acid to the exposed surface. After blackening, the masking material 12 is removed.

The chemically blackened layer is believed to be of the same approximate composition as the electrolytically blackened layer which is within the following ranges: 75%–100% by weight amorphous silicon, 0–25% by weight silicon hydride (one or more silicon hydrides such as SiH, $SiH_2$, $SiH_4$ or polymeric forms) and 0–25% by weight silicon dioxide. Both chemically blackened layers and electrolytically blackened layers have been previously observed on silicon and some indication of similarity in their properties has been observed such as by D. R. Turner, The Surface Chemistry of Metals and Semiconductors, Gatos, ed., published by John Wiley, New York, 1960, on page 285 and R. J. Archer, International Journal of the Physical Chemistry of Solids, 1960, volume 14, page 104. However, the use of chemically blackened surfaces for the diffusion of phosphorus produces different and in some respects advantageous results over the use of an electrolytically blackened surface which are not predictable from their known properties.

FIGURE 4 shows the resulting structure after phosphorus diffusion. The diffused N-type surface layer 16 penetrates deeper within the semiconductive body 10 under that portion of the surface which has been chemically blackened. The diffusion is performed in a closed quartz tube heated to a temperature of from about 1000° C. to about 1200° C. using elemental phosphorus as the diffusion source although other known phosphorus diffusion sources may be employed such as $P_2O_5$.

The chemical staining technique has been found to be advantageous compared with the electrolytic blackening technique in that a more uniform blackened layer may be readily formed on samples including those having relatively high resistivity, the thickness of the blackening may be carefully controlled because it builds up relatively slowly and the enhanced depth of penetration of phosphorus atoms may be more carefully controlled.

FIGURE 6 presents a curve showing the results obtained with different staining times on the depth ratio of diffusion where the depth ratio refers to ratio of the junction depth under the stained surface to that under the unstained surface. The stain employed was one made by mixing 50 cc. concentrated hydrofluoric acid and four drops concentrated nitric acid (a ratio of about 300:1 parts by volume). Results are shown for both a 0.3 ohm-cm. and an 8 ohm-cm. P-type silicon substrate.

FIGURE 5 shows the structure resulting after the surface layer 16 has been removed except for two upper portions which are separated by an etched groove to provide two distinct N-type regions 26 and 36 having junctions within the starting material 10 at different depths.

It is, of course, the case that the chemical blackening technique disclosed herein may be used to form a great variety of device structures among which those described in the before-mentioned copending application are examples. Because of the greater ease of control of the thickness of the blackened layer with the chemical stain technique, it is believed that greater precision in the delineation of junctions to differing depths or junctions which vary in depth may be achieved with this technique.

While the present invention has been shown and described in a few forms only, it will be apparent that various modifications may be made without departing from the spirit and scope thereof.

What is claimed is:

1. A method of diffusing phosphorus into a surface of a P-type silicon substrate which comprises: forming a blackened layer on at least a portion of said silicon surface by a chemical reaction with a hydrofluoric acid solution; exposing said surface with said blackened layer thereon to phosphorus so that atoms of phosphorus diffuse through said blackened layer into said substrate.

2. A method in accordance with claim 1 wherein: said exposing of said surface to phosphorus vapor is performed within a closed tube of refractory material heated to a temperature of from about 1000° C. to about 1200° C.

3. A method in accordance with claim 1 wherein: said forming of said blackened layer is performed by bringing into direct contact with said surface a mixture of from about 100 parts by volume to about 1000 parts by volume concentrated hydrofluoric acid and 1 part by volume concentrated nitric acid.

4. A method in accordance with claim 1 wherein: said forming of said blackened layer is performed by bringing into direct contact with said surface a mixture of about 300 parts by volume concentrated hydrofluoric acid and 1 part by volume concentrated nitric acid.

5. A method in accordance with claim 1 wherein prior to forming said blackened layer there is performed masking of said surface to prevent formation of said blackened layer except in select portions of said surface.

References Cited by the Examiner

UNITED STATES PATENTS

| | | | |
|---|---|---|---|
| 2,930,722 | 3/1960 | Ligenza | 148—189 |
| 3,009,841 | 11/1961 | Faust | 148—187 |
| 3,044,909 | 7/1962 | Shockley | 148—187 |
| 3,055,776 | 9/1962 | Stevenson | 148—187 |

OTHER REFERENCES

Ashner et al.: Journal of the Electrochemical Society, May 1959, pages 415 through 417.

HYLAND BIZOT, *Primary Examiner.*

DAVID L. RECK, *Examiner.*

H. W. CUMMINGS, *Assistant Examiner.*